US007278036B2

(12) United States Patent
Yuan

(10) Patent No.: US 7,278,036 B2
(45) Date of Patent: Oct. 2, 2007

(54) SYSTEM AND METHOD FOR STARTING UP PLURAL ELECTRONIC DEVICES IN AN ORDERLY MANNER

(75) Inventor: Ming-Huan Yuan, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 364 days.

(21) Appl. No.: 10/997,620

(22) Filed: Nov. 24, 2004

(65) Prior Publication Data

US 2005/0131552 A1 Jun. 16, 2005

(30) Foreign Application Priority Data

Dec. 13, 2003 (CN) .......................... 2003 1 0117423

(51) Int. Cl.
*G06F 1/26* (2006.01)
(52) U.S. Cl. ................. 713/300; 713/330; 307/11; 307/31; 307/36; 307/38
(58) Field of Classification Search ................. 713/300
See application file for complete search history.

(56) References Cited

U.S. PATENT DOCUMENTS

| 4,233,666 A * | 11/1980 | Walberg et al. ............ 365/226 |
| 4,891,636 A * | 1/1990 | Rieker ........................ 340/5.65 |
| 5,381,049 A * | 1/1995 | Onuma ......................... 307/86 |
| 5,752,047 A * | 5/1998 | Darty et al. ................ 713/300 |
| 5,758,193 A * | 5/1998 | Tsuji et al. .................... 710/64 |
| 6,868,501 B2 * | 3/2005 | Saitou et al. ............... 713/330 |
| 2001/0015639 A1* | 8/2001 | Aas et al. .................... 323/282 |
| 2004/0107313 A1* | 6/2004 | Kamo et al. ................ 711/114 |

* cited by examiner

*Primary Examiner*—Rehana Perveen
*Assistant Examiner*—Nitin C. Patel
(74) *Attorney, Agent, or Firm*—Morris Manning & Martin LLP; Tim Tingkang Xia, Esq.

(57) ABSTRACT

A system for starting up plural electronic devices includes an external controller, a power source, and four backboards. The external controller includes four output ends. Each backboard includes a power switch connected to a respective electronic device and to the power source, an onboard controller connected to the respective power switch, and first and second connectors each having four ends. Fourth, first, second and third ends of the first connector are respectively connected to first, second, third, fourth ends of the second connector. The onboard controller includes four input ends respectively connected to the four ends of the first connector, and an output end connected to the power switch. Signals output from the external controller are received as four different input signals at the four onboard controllers, the input signals corresponding to four different time delays for the onboard controllers to output signals to start up the four electronic devices.

13 Claims, 3 Drawing Sheets

# SYSTEM AND METHOD FOR STARTING UP PLURAL ELECTRONIC DEVICES IN AN ORDERLY MANNER

CROSS-REFERENCE TO RELATED APPLICATIONS

This application is related to a copending U.S. patent application entitled "SYSTEM AND METHOD FOR STARTING UP PLURAL ELECTRONIC DEVICES IN AN ORDERLY MANNER", recently filed with the same assignee as the instant application and with the application Ser. No. 10/997,393, filed on Nov. 23, 2004. The disclosure of the above identified application is incorporated herein by reference.

BACKGROUND OF THE INVENTION

1. Field of the Invention

The present invention pertains to systems and methods for starting up electronic devices, and particularly to a system and method for starting up plural electronic devices in an orderly sequential manner.

2. Description of Prior Art

A computer storage device used for storing data is generally a hard disk or another similar kind of storage device. When the stored data exceed the capacity of the storage device, plural of the storage devices can be connected together to enlarge a total available capacity.

When a power source is turned on, current from the power source drives a motor of a hard disk so that the hard disk rotates and begins to operate. Each hard disk requires a separate driving current. An initial instantaneous peak-value current of the hard disk is equivalent to the driving current. Thereafter, a working current of the hard disk decreases to an average value of less than the driving current. If the driving current of the hard disk is two amperes, and only one hard disk is connected, the initial instantaneous peak-value current of the power source is also two amperes. After the hard disk reaches an operating speed, the working current of the hard disk decreases to an average value less than two amperes. The total instantaneous peak-value current can be easily supplied by the power source if there are only relatively few hard disks connected together. However, if numerous hard disks are connected together to enlarge the total capacity, the total instantaneous peak-value current is correspondingly high. For example, if eight hard disks are connected together, the total instantaneous peak-value current of the hard disks is sixteen amperes. Commonly used power sources are not able to support such a strong current, and a special power source is needed. However, the purchase and running costs of such power source are correspondingly high.

Therefore, there is a need for a system and method to start up plural electronic devices in an orderly manner so as to decrease the instantaneous peak-value current required when the plural hard disks are started up.

SUMMARY OF THE INVENTION

A primary objective of the present invention is to provide a system for starting up plural electronic devices in an orderly manner.

A secondary objective of the present invention is to provide a method for starting up plural electronic devices in an orderly manner.

In order to fulfill the above-mentioned primary objective, the present invention provides a system for starting up plural electronic devices in an orderly manner. The system comprises an external controller, a power source, and a plurality of backboards. The external controller comprises N output ends. Each of the backboards comprises a power switch connected to the power source and at least one of the electronic devices, an onboard controller connected to the power switch, a first connector, and a second connector. The power switch is used for switching a connectivity between the power source and the at least one electronic device on and off. The onboard controller comprises N input ends and an output end, and is used for providing an output to the power switch to control switching on and off of the connectivity between the power source and the at least one electronic device. Each of the connectors comprises N ends. The N ends of the first connector are respectively connected to the N input ends of the onboard controller in one-to-one correspondence. A first end of the first connector is connected to a second end of the second connector; a second end of the first connector is connected to a third end of the second connector; and so on through to, or including; an N−1th end of the first connector is connected to an Nth end of the second connector; and an Nth end of the first connector is connected to a first end of the second connector. However a terminal one of the backboards need not have a second connector. The N ends of a first connector of a first one of the backboards are respectively connected to the N output ends of the external controller in one-to-one correspondence, and the N ends of the second connector of the first backboard are connected to the N ends of the first connector of a second one of the backboards in one-to-one correspondence. The N ends of a second connector of each of the backboards from the second backboard on except for the terminal backboard are connected to the N ends of the first connector of a corresponding subsequent backboard in one-to-one correspondence. In addition, N is a natural number equal to or greater than 2.

In operation of the system, signals output from two or more of the output ends of the external controller are received as different input signals at the onboard controllers, the input signals corresponding to different time delays for the onboard controllers to output signals to start up the corresponding electronic devices.

In order to fulfill the above-mentioned second objective, a method for starting up plural electronic devices in an orderly manner is provided. The method comprises the steps of: (i) presetting N output ends of an external controller; (ii) outputting default voltage levels to respective power switches that are each connected to respective one or more of the electronic devices, for switching off corresponding connectivities between a power source and the electronic devices; (iii) outputting a voltage level other than the default voltage level by a first one of onboard controllers to a respective power switch when a first time delay has elapsed from the time of the outputting of the default voltage levels, for switching on the corresponding connectivity between the power source and corresponding one or more of the electronic devices; (iv) outputting the voltage level other than the default voltage level by a subsequent one of the onboard controllers to a respective power switch when a subsequent time delay has elapsed from the time of the outputting of the default voltage levels, for switching on the corresponding connectivity between the power source and corresponding one or more of the electronic devices; and (v) repeating the above outputting step if and as necessary for any and all further onboard controllers, respective power switches, and corresponding connectivities between the power source and corresponding one or more of the electronic devices. In this method, N is a natural number equal to or greater than 2.

Other objects, advantages and novel features of the present invention will become more apparent from the following detailed description when taken in conjunction with the accompanying drawings, in which:

DETAILED DESCRIPTION OF THE INVENTION

Figure 1:
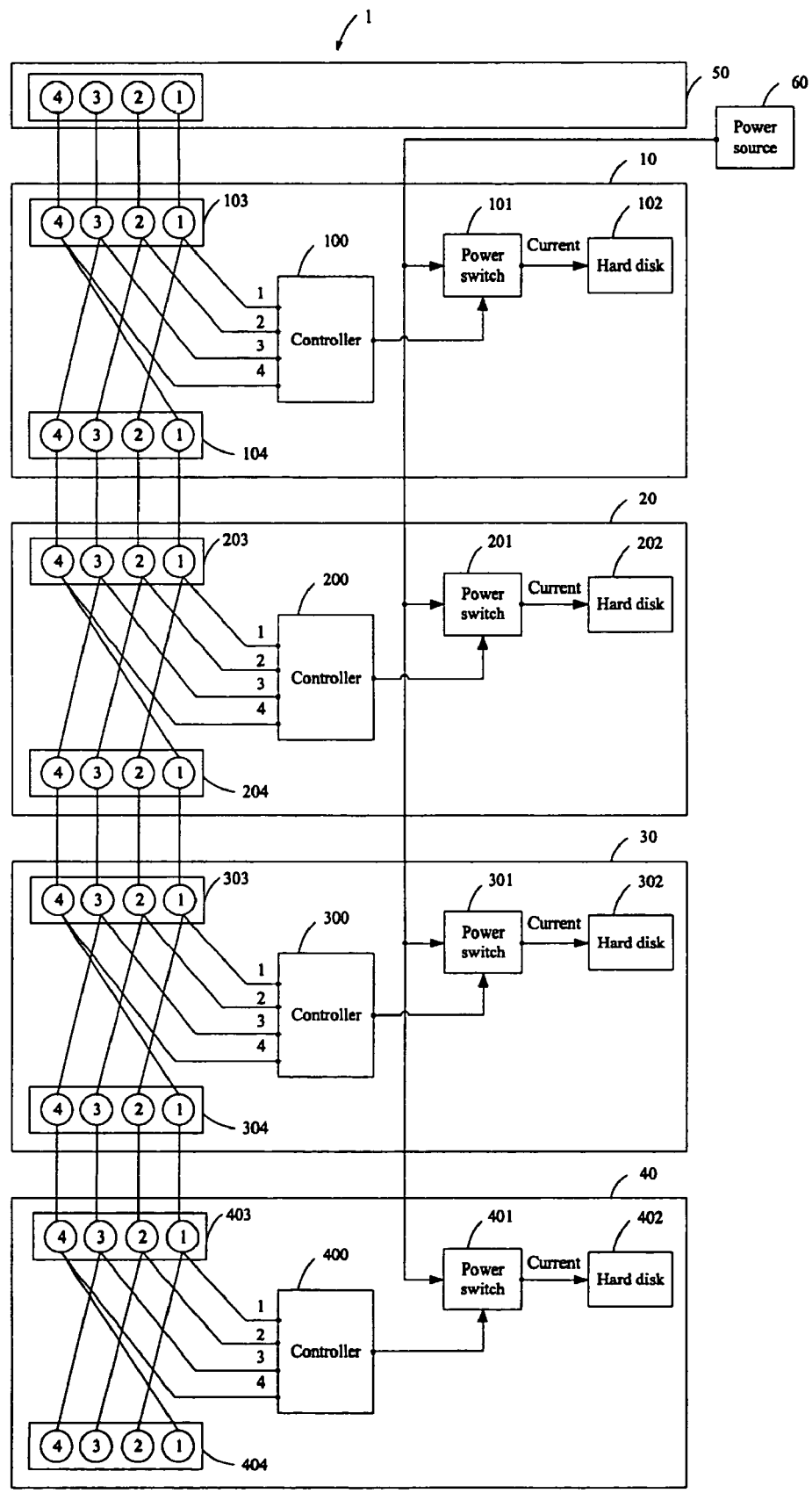
FIG. 1 is a block diagram of hardware infrastructure of a system for starting up plural electronic devices in an orderly manner according to a preferred embodiment of the present invention, the hardware infrastructure comprising four controllers.

FIG. 1 is a block diagram of hardware infrastructure of a system 1 for starting up plural electronic devices in an orderly manner according to a preferred embodiment of the present invention. In the preferred embodiment, the electronic devices are hard disks 102, 202, 302, 402. In the preferred embodiment, the system 1 comprises a first backboard 10, a second backboard 20, a third backboard 30, a fourth backboard 40, an external controller 50, and a power source 60. The external controller 50 comprises four output ends. Each of the four output ends can be set to output a low voltage level or a high voltage level. The first backboard 10 comprises a controller 100, a power switch 101, the hard disk 102, a connector 103, and a connector 104. The controller 100 comprises four input ends, and an output end that is connected to the power switch 101. The power switch 101 is also connected to the power source 60 and the hard disk 102.

Each of the connectors 103, 104 comprises four output ends. The four output ends of the connector 103 are respectively connected to the four input ends of the controller 100 in one-to-one correspondence. In addition, a first of the output ends of the connector 103 is connected to a second input end of the connector 104; a second of the output ends of the connector 103 is connected to a third input end of the connector 104; a third of the output ends of the connector 103 is connected to a fourth input end of the connector 104; and a fourth of the output ends of the connector 103 is connected to a first input end of the connector 104.

Under the control of the controller 100, the power switch 101 switches connectivity between the power source 60 and the hard disk 102 on and off. In the preferred embodiment, when the controller 100 outputs a default voltage level, the power switch 101 switches off the connectivity. Conversely, when the controller 100 outputs a voltage level other than the default voltage level, the power switch 101 switches on the connectivity. In the preferred embodiment, the default voltage level is a high voltage level. Thus, the power switch 101 switches off the connectivity when the controller 100 outputs the high voltage level, and switches on the connectivity when the controller 100 outputs the low voltage level. In an alternative embodiment, the default voltage level is a low voltage level. In the preferred embodiment, because the system 1 employs four backboards 10, 20, 30, 40, the output voltage level of the controller 100 only depends on input voltage levels to a first of the input ends and a second of the input ends of the controller 100. In an alternative embodiment, if more than four backboards are employed, the output voltage level of the controller 100 depends on input voltage levels to more than two of the input ends of the controller 100. For example, if sixteen backboards are employed, the output voltage level of the controller 100 depends on input voltage levels to all four of the input ends of the controller 100.

In the preferred embodiment of the present invention, the second backboard 20, the third backboard 30 and the fourth backboard 40 have similar structures to that of the first backboard 10, as shown in FIG. 1. For the sake of brevity, the second, third and fourth backboards 20, 30, 40 are not fully described in detail herein. Like references numerals of components of the first, second, third and fourth backboards 10, 20, 30, 40 indicate like components. The power switches 101, 201, 301, 401 are commonly connected to the power source 60. The four output ends of the external controller 50 are respectively connected to four input ends of the connector 103 in one-to-one correspondence. Four output ends of the connector 104 are respectively connected to four input ends of a connector 203 in one-to-one correspondence. Four output ends of a connector 204 are respectively connected to four input ends of a connector 303 in one-to-one correspondence. Four output ends of a connector 304 are respectively connected to four input ends of a connector 403 in one-to-one correspondence. Thus, the external controller 50, the first backboard 10, the second backboard 20, the third backboard 30, and the fourth backboard 40 are connected together in series. In the preferred embodiment, a connector 404 of the fourth backboard 40 is not used. In an alternative embodiment, a second connector of the terminal backboard is not used.

In the preferred embodiment of the invention, a high voltage level is represented by the number "1." In contrast, a low voltage level is represented by the number "0." If a first and a second of the output ends of the external controller 50 are set to output low voltage levels, simultaneously a third and a fourth of the output ends of the external controller 50 are set to output high voltage levels, and the outputs of the four output ends of the external controller 50 are recorded as "0011." On the first backboard 10, because the four input ends of the connector 103 are respectively connected to the four output ends of the external controller 50, the four output ends of the connector 103 are recorded as outputting "0011." Thus, the four input ends of the controller 100 are recorded as receiving "0011," and the four input ends of the connector 104 are respectively recorded as receiving "1001." On the second backboard 20, because the four input ends of the connector 203 are respectively connected to the four output ends of the connector 104, four output ends of the connector 203 are recorded as outputting "1001." Thus, four input ends of a controller 200 are recorded as receiving "1001," and four input ends of the connector 204 are respectively recorded as receiving "1100." On the third backboard 30, because the four input ends of the connector 303 are respectively connected to the four output ends of the connector 204, four output ends of the connector 303 are recorded as outputting "1100." Thus, four input ends of a controller 300 are recorded as receiving "1100," and four input ends of the connector 304 are respectively recorded as receiving "0110." On the fourth backboard 40, because the four input ends of the connector 403 are respectively connected to the four output ends of the connector 304, four output ends of the connector 403 are recorded as outputting "0110." Thus, four input ends of a controller 400 are recorded as receiving "0110."

Figure 2:
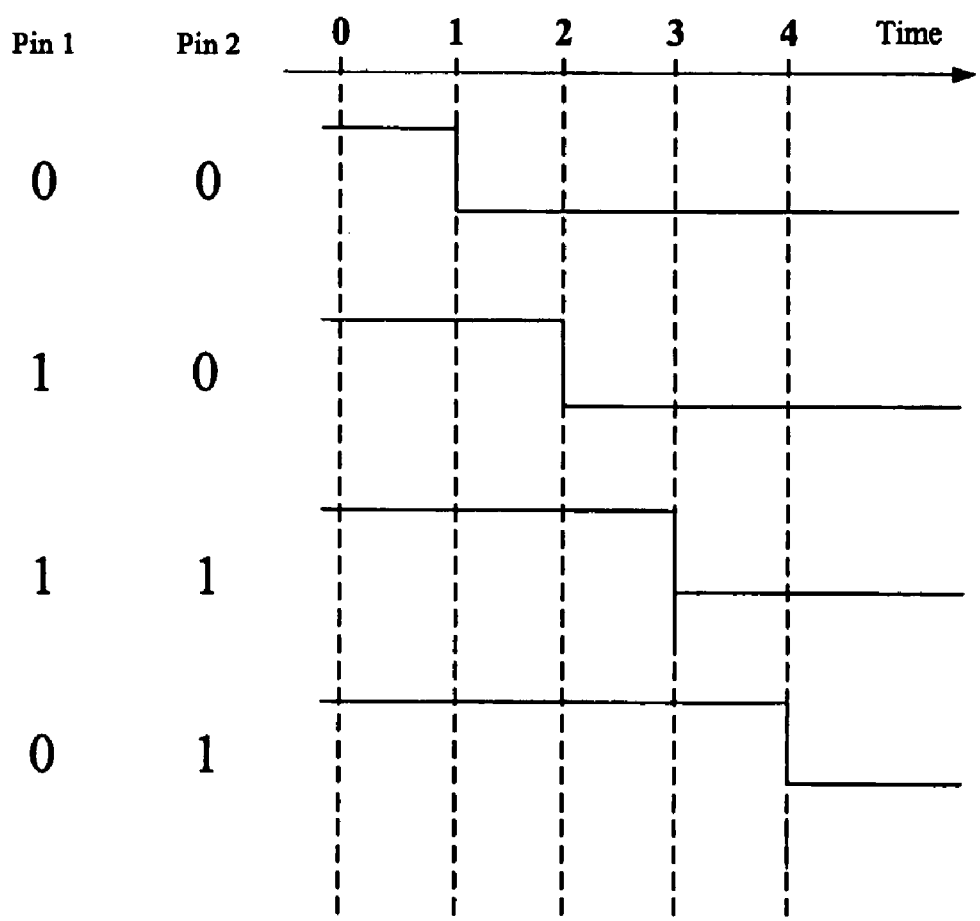
FIG. 2 is a diagram of input voltage levels and output voltage levels of the four controllers of FIG. 1.

Based on the different inputs that are received at the first and second input ends of the controllers 100, 200, 300, 400, the controllers 100, 200, 300, 400 are configured with different pre-determined time delays. Each time delay is a period of time between a moment when the respective controller 100, 200, 300, 400 is powered on, and a moment when the respective controller 100, 200, 300, 400 outputs a low voltage level. FIG. 2 illustrates the time delays of each controller 100, 200, 300, 400 outputting a low voltage level after the controller 100, 200, 300, 400 is powered on, on the assumption that the four controllers 100, 200, 300, 400 simultaneously output respective high voltage levels immediately upon being powered on simultaneously at time "0."

In the preferred embodiment of the present invention, the four controllers 100, 200, 300, 400 are cooperatively configured as follows. If the input voltage levels of the first input end and the second input end of the controller 100 are "00," the controller 100 outputs a low voltage level after a first time delay; if the input voltage levels of the first input end and the second input end of the controller 200 are "10," the controller 200 outputs a low voltage level after a second time delay; if the input voltage levels of the first input end and the second input end of the controller 300 are "11," the controller 300 outputs a low voltage level after a third time delay; and if the input voltage levels of the first input end and the second input end of the controller 400 are "01," the controller 400 outputs a low voltage level after a fourth time delay. Each time delay is calculated from the moment when the respective controller 100, 200, 300, 400 is powered on.

Figure 3:
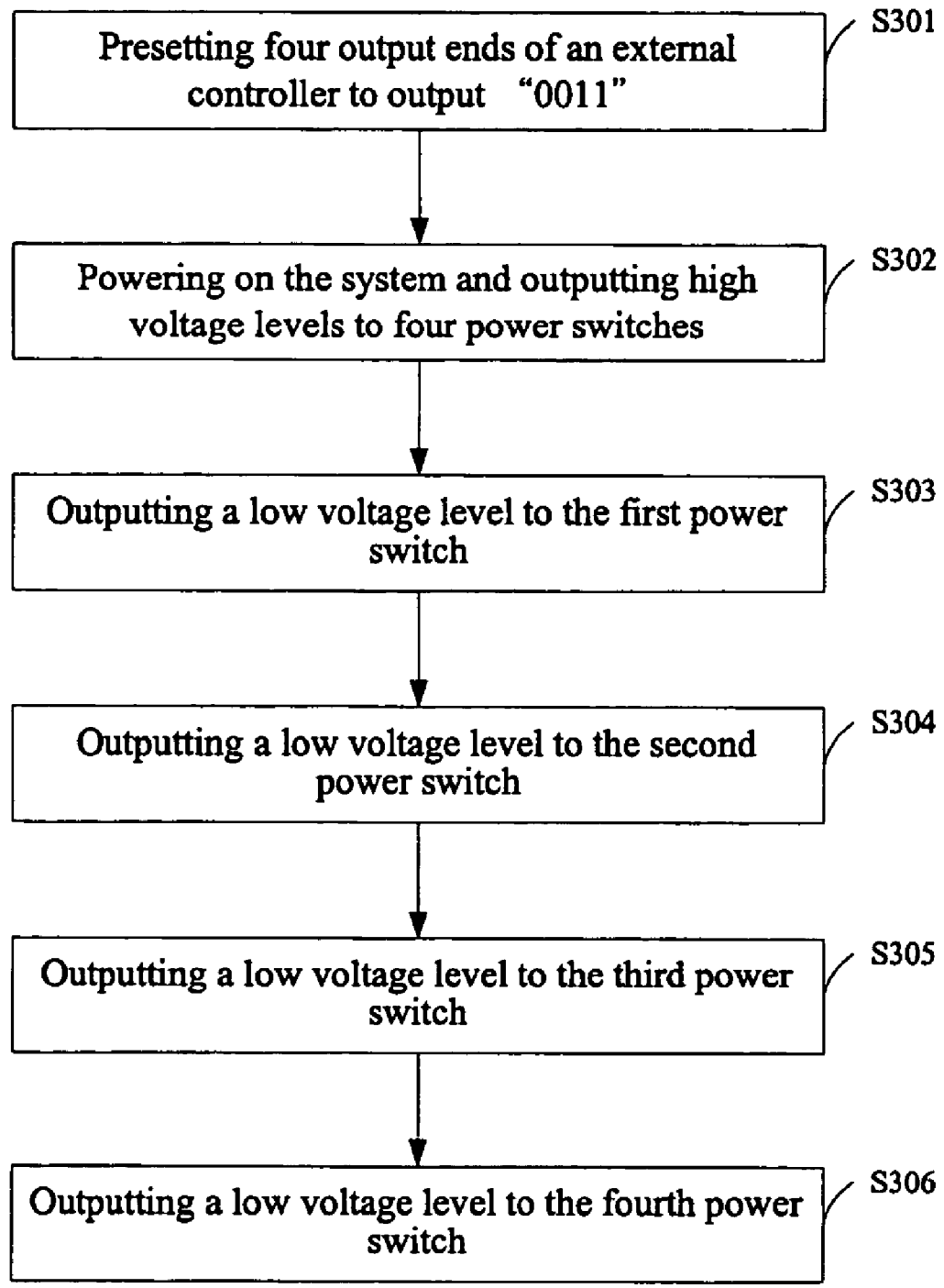
FIG. 3 is a flow chart of a preferred method for starting up plural electronic devices in an orderly manner in accordance with the present invention.

FIG. 3 is a flow chart of a preferred method for starting up plural electronic devices in an orderly manner in accordance with the present invention. At step S301, the four output ends of the external controller 50 are preset to output "0011," and thus the first input ends and the second input ends of the four controllers 100, 200, 300, 400 are respectively recorded as receiving "00,""10,""11,""01." The numbers "0" and "1" respectively represent the low voltage level and the high voltage level. At step S302, when the system 1 is powered on by the power source 60, the four controllers 100, 200, 300, 400 immediately output respective high voltage levels to the respective power switches 101, 201, 301, 401. The power switches 101, 201, 301, 401 switch off the respective connectivities between the power source 60 and the respective hard disks 102, 202, 302, 402.

At step S303, after the first predetermined time delay elapses, the controller 100 with the first and second of the input ends that are recorded as receiving "00" outputs the low voltage level to the power switch 101. The power switch 101 switches on the connectivity between the power source 60 and the hard disk 102. The hard disk 102 is started up. At step S304, after the second predetermined time delay elapses, the controller 200 with the first and second of the input ends that are recorded as receiving "10" outputs the low voltage level to the power switch 201. The power switch 201 switches on the connectivity between the power source 60 and the hard disk 202. The hard disk 202 is started up. At step S305, after the third predetermined time delay elapses, the controller 300 with the first and second of the input ends that are recorded as receiving "11" outputs the low voltage level to the power switch 301. The power switch 301 switches on the connectivity between the power source 60 and the hard disk 302. The hard disk 302 is started up. At step S306, after the fourth predetermined time delay elapses, the controller 400 with the first and second of the input ends that are recorded as receiving "01" outputs the low voltage level to the power switch 401. The power switch 401 switches on the connectivity between the power source 60 and the hard disk 402. The hard disk 402 is started up. Thus, starting up of the hard disks 102, 202, 302, 402 in an orderly manner is realized.

In the preferred embodiment of the present invention, the system 1 employs the four hard disks 102, 202, 302, 402 on the respective backboards 10, 20, 30, 40. In alternative embodiments, more than one hard disk may be provided on any one or more of the backboards 10, 20, 30, 40. Each of the hard disks on one backboard 10, 20, 30, 40 can be set with a unique time delay for it to be started up. The more hard disks that are employed by the system 1, the greater the time needed to start up all the hard disks. Further, no power source can support an unlimited number of hard disks. In practice, it is believed that the maximum number of hard disks that can be employed is likely to be thirty-six.

While a preferred and alternative embodiments of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A system for starting up plural electronic devices in an orderly manner, the system comprising:

an external controller comprising N output ends;

a power source;

a plurality of backboards, each of the backboards comprising:

a power switch connected to the power source and at least one of the electronic devices, for switching a connectivity between the power source and the at least one electronic device on and off;

an onboard controller connecting to the power switch, being configured with N input ends and an output end, for providing an output to the power switch to control switching on and off of the connectivity between the power source and the at least one electronic device;

a first connector, comprising N ends that are respectively connected to the N input ends of the onboard controller in one-to-one correspondence; and a second connector comprising N ends, a first end of the second connector being connected to an Nth end of the first connector, a second end of the second connector being connected to a first end of the first connector, and so on through to, or including, an Nth end of the second connector being connected to an N−1th end of the first connector; provided however that a terminal one of the backboards need not have a second connector;

wherein the N ends of the first connector of a first one of the backboards are respectively connected to the N output ends of the external controller in one-to-one correspondence, and the N ends of the second connector of the first backboard are connected to the N ends of the first connector of a second one of the backboards in one-to-one correspondence;

the N ends of the second connector of each of the backboards from the second backboard on except for the terminal backboard are connected to the N ends of the first connector of a corresponding subsequent backboard in one-to-one correspondence; and N is a natural number equal to or greater than 2.

2. The system as recited in claim 1, wherein each of the N output ends of the external controller is preset as either a low voltage level or a high voltage level.

3. The system as recited in claim 1, wherein the output of each of the onboard controllers to the corresponding power switch is a voltage level.

4. The system as recited in claim 3, wherein when each of the onboard controllers is powered on, the onboard controller outputs a default voltage level to the corresponding power switch for switching off the connectivity between the power source and the corresponding at least one electronic device.

5. The system as recited in claim 4, wherein each of the onboard controllers outputs a voltage level other than the default voltage level to the corresponding power switch for switching on the connectivity between the power source and the corresponding at least one electronic device after a time delay has elapsed from the time of outputting of the default voltage level by the onboard controller.

6. A method for starting up plural electronic devices in an orderly manner in a computer system, which comprises a plurality of backboards, the method comprising the steps of:
in each of the backboards:
  connecting N ends of a first connector to N input ends of an onboard controller in one-to-one correspondence; and
  connecting a first end of a second connector to an Nth end of the first connector, connecting a second end of the second connector to a first end of the first connector, and so on through to, or including, an Nth end of the second connector being connected to an N−1th end of the first connector;
  connecting the N ends of the second connector of a preceeding one of the backboards to N ends of the first connector of a subsequent one of the backboards in one-to-one correspondence;
  connecting N output ends of an external controller to the N ends of the first connector of the first one of the backboards in one-to-one correspondence;
presetting N output ends of an external controller;
outputting default voltage levels to respective power switches that are each connected to respective one or more of the electronic devices, for switching off corresponding connectivities between a power source and the electronic devices;
outputting a voltage level other than the default voltage level by a first one of onboard controllers to a respective power switch when a first time delay has elapsed from the time of the outputting of the default voltage levels, for switching on the corresponding connectivity between the power source and corresponding one or more of the electronic devices;
outputting the voltage level other than the default voltage level by a subsequent one of the onboard controllers to a respective power switch when a subsequent time delay has elapsed from the time of the outputting of the default voltage levels, for switching on the corresponding connectivity between the power source and corresponding one or more of the electronic devices; and
repeating the immediately above outputting step if and as necessary for any and all further onboard controllers, respective power switches, and corresponding connectivities between the power source and corresponding one or more of the electronic devices;
wherein N is a natural number equal to or greater than 2.

7. The method as recited in claim 6, wherein the step of presetting the N output ends of the external controller comprises the step of presetting each of the N output ends as either a low voltage level or a high voltage level.

8. The method as recited in claim 6, wherein the first time delay is determined by inputs to at least two of N input ends of the first onboard controller.

9. The method as recited in claim 6, wherein the subsequent time delay is determined by inputs to at least two of N input ends of the subsequent onboard controller.

10. The method as recited in claim 6, wherein the subsequent time delay is longer than a previous time delay.

11. A method for staffing up plural electronic devices in a predetermined order, comprising the steps of:
providing a controller electrically connected to a power switch of each of said plural electronic devices;
generating a sequence of N signals to said controller of a prior one of said plural electronic devices based on said predetermined order;
providing a control signal from said controller to said power switch in a predetermined time-delay manner corresponding to said sequence of N signals in order to start up said prior one of said plural electronic devices;
altering said sequence of N signals for said controller of a next one of said plural electronic devices based on said predetermined order, wherein a Nth signal in said sequence of N signals becomes a first signal in said sequence of N signals, a N−1th signal in said sequence of N signals becomes an Nth signal in said sequence of N signals, and so on through to, and including N, where N is a natural number equal to or greater than 2; and
repeating said signal-providing and altering steps in said predetermined order until all of said plural electronic devices are started up.

12. The method as recited in claim 11, wherein said prior one of said plural electronic devices in said predetermined order has a shorter time delay to start up than said next one of said plural electronic devices.

13. The method as recited in claim 11, wherein an external controller is used to generate said sequence of N signals in said generating step.

* * * * *